United States Patent
Burkhardt et al.

(10) Patent No.: US 11,821,382 B2
(45) Date of Patent: Nov. 21, 2023

(54) METHOD AND DEVICE FOR DETECTING A POWER-CHANGING MANIPULATION OF AN INTERNAL COMBUSTION ENGINE

(71) Applicant: Vitesco Technologies GmbH, Hannover (DE)

(72) Inventors: Thomas Burkhardt, Munich (DE); Andreas Holzeder, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/433,256

(22) PCT Filed: Mar. 5, 2020

(86) PCT No.: PCT/EP2020/055824
§ 371 (c)(1),
(2) Date: Aug. 24, 2021

(87) PCT Pub. No.: WO2020/182600
PCT Pub. Date: Sep. 17, 2020

(65) Prior Publication Data
US 2022/0136452 A1 May 5, 2022

(30) Foreign Application Priority Data
Mar. 13, 2019 (DE) .......................... 102019203376.8

(51) Int. Cl.
*F02D 41/28* (2006.01)
*F02D 41/22* (2006.01)
*F02D 41/14* (2006.01)

(52) U.S. Cl.
CPC ......... *F02D 41/22* (2013.01); *F02D 41/1401* (2013.01); *F02D 41/28* (2013.01);
(Continued)

(58) Field of Classification Search
CPC .. F02D 41/22; F02D 41/222; F02D 2041/223; F02D 2041/227;
(Continued)

(56) References Cited

U.S. PATENT DOCUMENTS

| 4,976,139 A | * | 12/1990 | Miyama | F02D 41/266 |
| | | | | 73/114.25 |
| 5,079,946 A | * | 1/1992 | Motamedi | G01D 3/08 |
| | | | | 73/114.36 |

(Continued)

FOREIGN PATENT DOCUMENTS

| CN | 104975962 A | 10/2015 |
| CN | 108884768 A | 11/2018 |

(Continued)

OTHER PUBLICATIONS

JP-2002242749-A—English Translation (Year: 2002).*
(Continued)

*Primary Examiner* — George C Jin
*Assistant Examiner* — Teuta B Holbrook
(74) *Attorney, Agent, or Firm* — Manelli Selter PLLC; Edward Stemberger

(57) ABSTRACT

The embodiment relates to a method for detecting a power-changing manipulation of an internal combustion engine (100), wherein the internal combustion engine (100) has an intake tract (110) and a pressure sensor (116, 118) which is arranged in the intake tract (110). The method has the following steps:
acquiring a signal profile (440) over a specific time period by means of the pressure sensor (116, 118),
providing a modelled signal profile (430) over the specific time period, from which periodically repeating modelled signal profile sections (432) which are characteristic of expected periodically repeating pressure changes in the intake tract (110) are ascertained,
(Continued)

comparing a signal portion of an acquired signal profile section (442) with the corresponding signal portion of the corresponding modelled signal profile section (432) in order to detect the power-changing manipulation of the internal combustion engine (100).

12 Claims, 1 Drawing Sheet

(52) U.S. Cl.
CPC .............. *F02D 2041/1423* (2013.01); *F02D 2041/1433* (2013.01); *F02D 2041/288* (2013.01); *F02D 2200/0406* (2013.01)

(58) Field of Classification Search
CPC ......... F02D 2041/228; F02D 2041/288; F02D 2041/1433; F02D 2200/602; F02D 2700/0274; F02D 2700/0279
USPC .......... 701/102, 107, 114; 73/114.33, 114.37
See application file for complete search history.

(56) References Cited

U.S. PATENT DOCUMENTS

| | | | | |
|---|---|---|---|---|
| 5,138,874 A | * | 8/1992 | Davis | F02B 77/08 73/114.37 |
| 2006/0184311 A1 | * | 8/2006 | Schulte | F02D 41/1498 701/114 |
| 2012/0234272 A1 | | 9/2012 | Sasaki | |
| 2014/0137552 A1 | * | 5/2014 | Yokono | F02D 41/10 60/600 |
| 2017/0130664 A1 | * | 5/2017 | Rueger | F02D 41/222 |
| 2017/0198649 A1 | | 7/2017 | Kainz et al. | |
| 2018/0156692 A1 | * | 6/2018 | Chen | F02D 41/0087 |
| 2018/0372009 A1 | * | 12/2018 | Braun | F02D 19/088 |
| 2019/0128206 A1 | * | 5/2019 | Burkhardt | F02D 41/10 |

FOREIGN PATENT DOCUMENTS

| | | | | |
|---|---|---|---|---|
| DE | 10346734 B3 | | 4/2005 | |
| DE | 102011108697 A1 | | 1/2013 | |
| DE | 102012001356 A1 | * | 7/2013 | .......... F02D 41/222 |
| DE | 102012001356 A1 | | 7/2013 | |
| DE | 102012219516 A1 | | 4/2014 | |
| DE | 102014208941 A1 | | 11/2015 | |
| DE | 102016211388 B3 | | 8/2017 | |
| DE | 102016222533 A1 | | 5/2018 | |
| JP | 2002242749 A | * | 8/2002 | .......... F02D 41/045 |
| JP | 2008267304 A | | 11/2008 | |
| KR | 1020080085748 A | | 9/2008 | |
| KR | 1020150054493 A | | 5/2015 | |
| KR | 1020180007941 A | | 1/2018 | |
| KR | 10-2018-0118221 | | 10/2018 | |
| WO | WO-2004013479 A1 | * | 2/2004 | .......... F02D 41/009 |
| WO | 2008122213 A1 | | 10/2008 | |
| WO | 2013080585 A1 | | 6/2013 | |
| WO | 2015197440 A1 | | 12/2015 | |
| WO | 2017178130 A1 | | 10/2017 | |

OTHER PUBLICATIONS

Office Action in DE 102019203376.8 dated Jan. 16, 2020.
International Search Report & Written Opinion in PCT/EP2020/055824 dated Jun. 24, 2020.
Search Report and Office Action in CN 202080020876.6 dated Feb. 17, 2023.
Office Action in KR 10-2021-7032855 dated Apr. 3, 2023.
Notice of Allowance in KR 10-2021-7032855 dated Jun. 8, 2023.

\* cited by examiner

METHOD AND DEVICE FOR DETECTING A POWER-CHANGING MANIPULATION OF AN INTERNAL COMBUSTION ENGINE

BACKGROUND

The present invention relates to a method and a device for detecting a power-changing manipulation of an internal combustion engine. For this purpose, the internal combustion engine has an intake tract and a pressure sensor, wherein the pressure sensor is arranged in the intake tract.

A controller of the internal combustion engine may be configured such that a fuel quantity to be injected is calculated from a modelled cylinder air mass. In order to achieve desired emissions characteristics of the combustion, the air-fuel ratio in the cylinder before the combustion is controlled in closed-loop fashion accordingly. Here, the fuel quantity to be injected is usually automatically adapted, on the basis of the oxygen concentration in the exhaust gas as measured by means of an exhaust-gas sensor, such that the desired air-fuel ratio is set. If the air mass in the cylinder is increased owing to a manipulation of the internal combustion engine, then the fuel quantity is consequently automatically increased such that the desired air-fuel ratio is set. The power of the internal combustion engine can thus be increased. However, owing to such a manipulation, the internal combustion engine is operated outside of its predetermined operating range, as a result of which the internal combustion engine can be damaged.

For example, it is conceivable that, with the aid of a manipulation device, measurement signals from the pressure sensors in the intake tract of the internal combustion engine can be modified such that the maximum air mass in the cylinder can be increased. An incorrect pressure can be transmitted to a control unit by means of such a manipulation device, whereupon the control unit controls the internal combustion engine such that it is operated outside of its predetermined operating range.

An internal combustion engine that is operated outside of its predetermined operating range can be damaged.

Document DE 10 2012 001 356 A1 discloses an internal combustion engine device of a motor vehicle, having at least one charge pressure sensor unit, which is provided for at least indirectly acquiring an actual charge pressure in an intake line of a supercharged internal combustion engine, and having an open-loop or closed-loop control unit which has a communication connection to the at least one charge pressure sensor unit, characterized in that the open-loop or closed-loop control unit is provided for comparing the actual charge pressure with at least one check value in at least one operating state.

Document DE 10 2011 108 697 A1 discloses a method for detecting the manipulation of an engine control unit of a motor vehicle, wherein a calculated reference value for the acceleration is compared with a measured actual acceleration value.

SUMMARY

It is an object of the invention to create a method and a device with which a reliable detection of a power-changing manipulation of an internal combustion engine is possible.

The object is achieved by the features of the independent patent claims. Advantageous refinements of the present disclosure are specified in the dependent claims.

According to the present disclosure, a method for detecting a power-changing manipulation of an internal combustion engine, wherein the internal combustion engine has an intake tract and a pressure sensor which is arranged in the intake tract, has the following steps:

acquiring a signal profile over a specific time period by means of the pressure sensor, wherein periodically repeating acquired signal profile sections which are characteristic of periodically repeating pressure changes in the intake tract are ascertained from the acquired signal profile, providing a modelled signal profile over the specific time period, from which periodically repeating modelled signal profile sections which are characteristic of expected periodically repeating pressure changes in the intake tract are ascertained, comparing at least one signal portion of the acquired signal profile section, which is characteristic of the pressure change in the intake tract in a period of the acquired signal profile, with a corresponding signal portion of the corresponding modelled signal profile section, which is characteristic of the expected pressure change in the intake tract during the same period, in order to detect the power-changing manipulation of the internal combustion engine.

The intake tract of the internal combustion engine supplies the internal combustion engine with air for the combustion during the operation of the internal combustion engine. The pressure sensor, which is arranged in the intake tract, acquires the prevailing pressure in the intake tract of the air supplied to the internal combustion engine during operation. In this regard, the pressure sensor outputs a measurement signal that is characteristic of the air pressure prevailing in the intake tract. The air pressure in the intake tract changes over time during the operation of the internal combustion engine. For example, if air inlet valves of the internal combustion engine that control the supply of air from the intake tract into the cylinders are opened, the air pressure in the intake tract correspondingly falls. Such a change in air pressure can for example be acquired by the pressure sensor. If the internal combustion engine has multiple cylinders, then the internal combustion engine has air inlet valves associated with each cylinder, which air inlet valves, when correspondingly controlled, allow air to flow into the cylinders of the internal combustion engine during operation. Accordingly, the air pressure in the intake tract changes, inter alia in accordance with the control and the number of cylinders or inlet valves. According to one embodiment, the pressure sensor is an intake pipe pressure sensor which is arranged upstream of the air inlet valves of the internal combustion engine in an air flow direction. According to one embodiment, the intake pipe pressure sensor is arranged directly upstream of the air inlet valves in the air flow direction. According to another embodiment, the pressure sensor is a charge pressure sensor which is arranged downstream of a compressor of an exhaust-gas turbocharger and upstream of a throttle flap in the air flow direction. According to a further embodiment, the charge pressure sensor is arranged directly downstream of the compressor of the exhaust-gas turbocharger in the air flow direction. According to a further embodiment, it is also possible for a multiplicity of pressure sensors to be arranged in the intake tract of the internal combustion engine; here, it is for example possible for one of the pressure sensors to be an intake pipe pressure sensor and for another of the pressure sensors to be a charge pressure sensor.

According to the present disclosure, a signal profile is acquired by means of the pressure sensor. Furthermore, periodically repeating acquired signal profile sections are ascertained from the acquired signal profile. The acquired signal profile sections are characteristic of the periodically repeating pressure changes in the intake tract over a specific time period. The pressure changes in the intake tract owing to the opening air inlet valves are substantially periodic. A period is in this case the smallest time interval after which the process is repeated. If, for example, the internal combustion engine has 2 cylinders, then a period begins, for example, when an air inlet valve of one of the two cylinders opens for the first time, and the period ends as soon as the same inlet valve is about to open again. One period consequently corresponds to one working cycle of the internal combustion engine. From the acquired signal profile of the pressure sensor, it is consequently relatively easily possible to ascertain signal profile sections which are characteristic of the periodically repeating pressure changes in the intake tract, by virtue of the acquired signal profile being subdivided and assigned correspondingly to the working cycles. One of the acquired signal profile sections consequently corresponds to a period of the repeating pressure changes in the intake tract.

According to the present disclosure, the modelled signal profile is made available, from which the periodically repeating modelled signal profile sections are ascertained. Here, the modelled signal profile sections are characteristic of expected periodically repeating pressure changes in the intake tract. According to one embodiment, the modelled signal profile is stored in a memory of a control unit and is read out from the memory and processed further. The modelled signal profile is ascertained, for example during the development of the internal combustion engine, for a wide variety of operating states of the internal combustion engine, and is stored in the memory accordingly. With changing parameters of the internal combustion engine, such as rotational speed or load, and with changing environmental parameters, such as ambient temperature or ambient pressure, the expected air pressure in the intake system changes, and the modelled signal profile that is made available should be adapted accordingly. According to one embodiment, the modelled signal profile takes such parameters into account, such that the corresponding modelled signal profile is made available for all operating conditions of the internal combustion engine. Just as the acquired signal profile sections are ascertained from the acquired signal profile, the modelled signal profile sections are ascertained from the modelled signal profile. According to another embodiment, the modelled signal profile sections may also be made available directly.

According to the present disclosure, one of the signal portions of an acquired signal profile section is compared with the corresponding signal portion of the corresponding modelled signal profile section. Here, the acquired signal profile section is characteristic of the pressure change in the intake tract during one period, for example during one working cycle. Furthermore, the corresponding modelled signal profile section is characteristic of the expected pressure change in the intake tract during the same period. Consequently, the signal portion of the acquired signal profile section is compared with the corresponding signal portion of the corresponding modelled signal profile section. A signal portion is, for example, a characteristic signal deflection, a characteristic gradient change, a local or global maximum, a local or global minimum, an amplitude or a phase of the corresponding signal profile sections. If that signal portion of the acquired signal profile section which is to be compared is the global maximum thereof, then the signal portion of the corresponding modelled signal profile section is also the global maximum thereof.

The modelled signal profile can be determined, for example in the course of the development process of the internal combustion engine, on a test bench, such that the modelled signal profile can be made available relatively easily. It is likewise very easy to ascertain the periodically repeating modelled signal profile sections from the modelled signal profile that is made available, by virtue of the signal profile preferably being subdivided into the modelled signal profile sections on the basis of the corresponding period.

If the internal combustion engine has been manipulated, for example in order to achieve a higher level of power from the internal combustion engine, it may be the case that the internal combustion engine is operated outside of its predetermined operating range. A higher level of power can be achieved for example by increasing the pressure in the intake tract and consequently also the pressure in the cylinders of the internal combustion engine. Such a change in the pressure in the intake tract can be detected in a signal portion of the acquired signal profile section. If the corresponding signal portion of the acquired signal profile section is now compared with the corresponding signal portion of the corresponding modelled signal profile section, it is for example possible to detect an elevated pressure in relation to the corresponding modelled state of the internal combustion engine. On the basis of the increased pressure in the intake tract, conclusions can be drawn regarding the power-changing manipulation of the internal combustion engine. Such a detection is comparatively simple and reliable and is possible over the entire operating range of the internal combustion engine. It is thus possible in a very simple and reliable manner to detect whether the internal combustion engine has been manipulated, simply through the acquisition of a signal profile by means of the pressure sensor, the provision of the modelled signal profile and the evaluation of the two profiles.

According to one embodiment, in the comparison of the signal portion of the acquired signal profile section with the corresponding signal portion of the corresponding modelled signal profile section, a signal portion difference which corresponds to the time difference between the signal portion of the acquired signal profile section and the signal portion of the corresponding modelled signal profile section is taken into account. If, for example, the signal portion of the acquired signal profile section is the global maximum in the acquired signal profile section and, consequently, the corresponding signal portion of the corresponding modelled signal profile section is the global maximum thereof, then the signal portion difference can be calculated by virtue of the point in time of the occurrence of the global maximum in the acquired signal profile section and the point in time of the occurrence of the global maximum in the modelled signal profile section being subtracted from one another. The signal portion difference is accordingly the time difference between the occurrence of the one global maximum and the other global maximum. If, for example, the pressure sensor of the internal combustion engine and/or the transmission of the measurement signal from the pressure sensor to the control unit is manipulated such that a time delay can be detected in the acquired signal profile in relation to the modelled signal profile, it is consequently possible, in accordance with this embodiment, to very easily detect that internal combustion engine has been subjected to a power-changing manipulation.

According to a further embodiment, the power-changing manipulation on the internal combustion engine is detected if the signal portion difference exceeds a first threshold value. According to one embodiment, the signal portion difference may be evaluated by the control unit of the internal combustion engine continuously, and this evaluation may be compared with the first threshold value accordingly. As soon as the signal portion difference exceeds a threshold value, it is accordingly possible to infer the power-changing manipulation of the internal combustion engine. Such a comparison can be implemented relatively easily and reliably indicates whether the internal combustion engine has been manipulated.

According to one embodiment, an acquired signal profile function which is characteristic of the acquired signal profile section is developed from the first signal profile section with the aid of a Fourier transformation. Additionally, according to this embodiment, a phase of the acquired signal profile function is ascertained, and the ascertained phase as the signal portion of the acquired signal profile section is compared with a modelled phase as a corresponding signal portion of the corresponding modelled signal profile section, wherein the modelled phase is made available as a portion of the modelled signal profile section.

According to a further embodiment, the modelled phase may also be ascertained from the corresponding modelled signal profile section. The acquired signal profile function may be developed from the acquired signal profile section by means of the Fourier transformation. Accordingly, the acquired signal profile function is characteristic of the acquired signal profile section and is accordingly also characteristic of the pressure changes in the intake tract during a period. The corresponding signal portions of the signal profile function can be identified more easily by means of the Fourier transformation, such that the comparison of the corresponding signal portions from the signal profile functions is simplified. Accordingly, the method for detecting the power-changing manipulation of the internal combustion engine is more robust and reliable.

According to a further embodiment, the Fourier transformation is a discrete Fourier transformation.

According to one embodiment, exactly one phase of the acquired signal profile function as a signal portion is compared with the corresponding modelled phase of the corresponding modelled signal profile section. Here, the modelled signal profile or the modelled signal profile section is made available such that, from this, it is possible to ascertain the modelled phase, which can be compared with the ascertained phase. A phase is the position of a corresponding point at a specific time in a signal profile section or in a signal profile function. If the comparison deviates from predetermined values, conclusions can accordingly be drawn regarding the manipulation of the internal combustion engine. According to one embodiment, the modelled phase as a signal portion of the modelled signal profile section may be stored in the memory and made available from the memory for the comparison.

According to a further embodiment, a modelled signal profile function, which is characteristic of the expected periodically repeating pressure changes in the intake tract, is developed from the modelled signal profile section with the aid of a Fourier transformation. Additionally, the modelled phase is ascertained from the modelled signal profile function and is made available. It is conceivable that the modelled signal profile sections are stored in the memory and that the modelled signal profile function is developed from the signal profile sections by means of a processing unit with the aid of the Fourier transformation, in order that the corresponding signal portion of the modelled signal profile function can be compared in a simplified manner with the corresponding signal portion of the acquired signal profile function. The modelled phase, which is required for comparison with the ascertained phase, can be ascertained from the modelled signal profile function in order that the comparison can be carried out to identify whether the internal combustion engine has been manipulated. It can thus be ensured that, in all cases, signal portions that are comparable with one another are compared with one another.

According to one embodiment, the modelled signal profile is made available as a characteristic map which takes operating parameters of the internal combustion engine into account. Operating parameters of the internal combustion engine may for example be a rotational speed or a load. According to this embodiment, the modelled signal profile is adapted according to the operating parameters of the internal combustion engine such that the corresponding modelled signal profile section or the corresponding modelled signal profile function can be compared with the acquired signal profile section or the acquired signal profile function. According to one embodiment, the characteristic map may be a mathematical model that makes available the modelled signal profile and/or the modelled signal profile section and/or the modelled signal profile function and/or the corresponding signal portion in a manner dependent on the operating parameters of the internal combustion engine and/or in a manner dependent on environmental parameters. It is consequently possible in a very simple manner, even at different operating points of the internal combustion engine, to identify a power-changing manipulation of the internal combustion engine.

According to a further embodiment, the phase of the modelled signal profile section is made available in a manner dependent on at least one operating parameter of the internal combustion engine. As already described, it is conceivable that the phase of the modelled signal profile is made available as the signal portion of the corresponding modelled signal profile in order to be compared with the ascertained phase of the acquired signal profile section. It is conceivable that the ascertained phase changes in a manner dependent on operating parameters of the internal combustion engine such as the rotational speed and/or the load. Accordingly, the modelled phase must likewise change in a manner dependent on the operating parameters of the internal combustion engine in order that a meaningful comparison can be carried out to detect the power-changing manipulation of the internal combustion engine. Accordingly, the modelled phase can be made available even in the case of changing operating parameters, such that the method robustly and reliably detects the manipulation of the internal combustion engine even in the case of changing operating parameters.

According to one embodiment, for the comparison of the signal portion of the acquired signal profile section with the corresponding signal portion of the corresponding modelled signal profile section, a phase difference of the ascertained phase as a signal portion of the acquired signal profile section and the modelled phase as a signal portion of the corresponding modelled signal profile section is ascertained. The phase difference between the ascertained phase and the modelled phase is the time difference between a characteristic signal section, such as a zero crossing of the acquired signal profile section, and the corresponding characteristic signal section, such as the corresponding zero crossing of the corresponding modelled signal profile section. The phase difference is consequently characteristic of the time offset of the occurrence of characteristic signal sections of the modelled signal profile section and of the corresponding acquired signal profile section. If the acquired signal profile section deviates in terms of time from the modelled signal profile section, this can be identified through the ascertainment the phase difference. In the event of an excessive deviation, it can be inferred that the internal combustion engine has been manipulated.

According to one embodiment, the ascertained phase difference is compared with a phase difference threshold value, and the power-changing manipulation of the internal combustion engine is detected if the ascertained phase difference exceeds the phase difference threshold value. The phase difference threshold value may for example be stored in the memory and continuously compared with the ascertained phase difference. As soon as it is detected that the ascertained phase difference exceeds the phase difference threshold value, it can be inferred that the internal combustion engine has been manipulated. Accordingly, by means of this comparison, it can be detected very easily whether the internal combustion engine has been manipulated.

According to one embodiment, the threshold values of the present disclosure may also be a limit band, wherein the power-changing manipulation of the internal combustion engine is detected if the value to be compared with the limit band breaks out of the limit band.

According to the present invention, a device for detecting a power-changing manipulation of an internal combustion engine has a control unit which is configured to control an abovementioned method. The device may for example be an engine control unit. It is also conceivable that the device is part of the engine control unit or is installed as an additional control unit, for example in a vehicle with the internal combustion engine.

BRIEF DESCRIPTION OF THE DRAWINGS

Exemplary embodiments of the present disclosure are illustrated in the figures and will be explained in more detail on the basis of the following description. In the figures.

DETAILED DESCRIPTION OF EXAMPLE EMBODIMENTS

Figure 1:
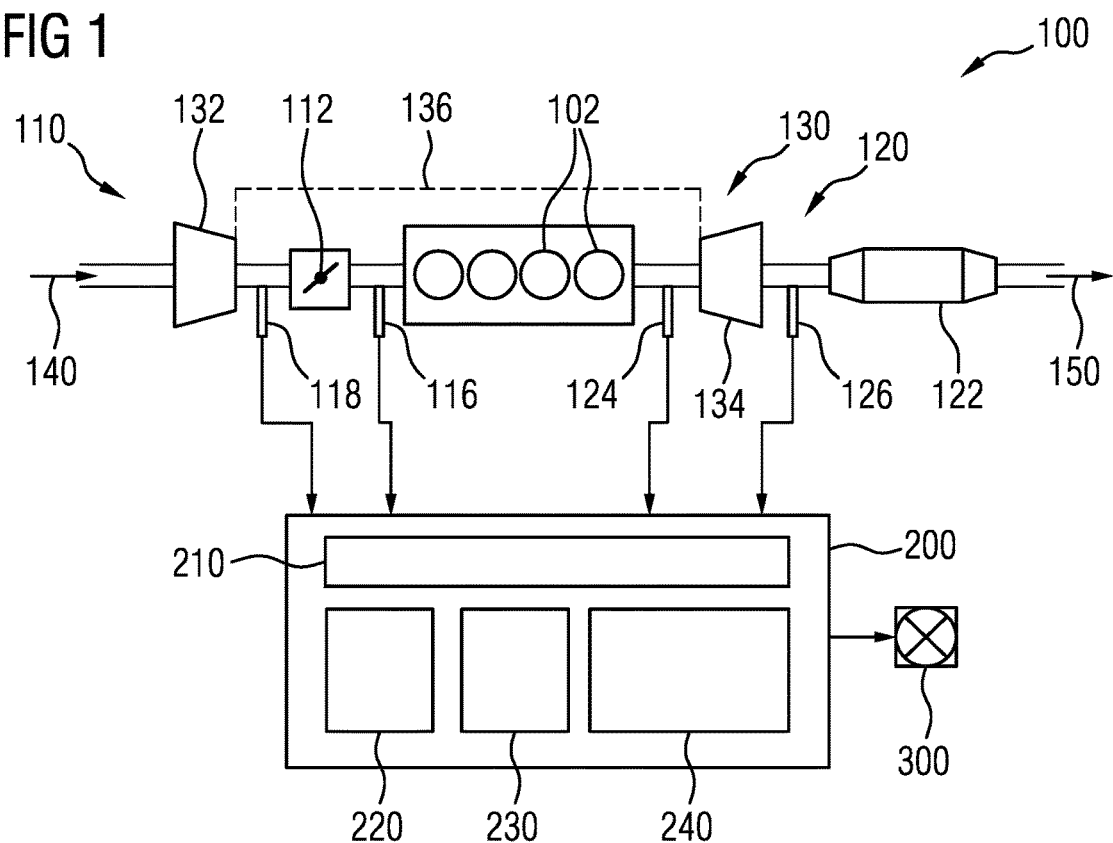
FIG. 1 shows, in a schematic illustration, a block diagram of an internal combustion engine.

FIG. 1 shows a schematic illustration of an internal combustion engine 100 with multiple cylinders 102, wherein the internal combustion engine 100 is for example configured for driving a vehicle. The internal combustion engine 100 has an intake tract 110. The intake tract 110 supplies the internal combustion engine with air 140 during operation. To control the air supply during operation of the internal combustion engine 100, the intake tract 110 has a throttle flap 112.

The internal combustion engine 100 additionally has an exhaust-gas tract 120. The exhaust-gas tract has an exhaust-gas catalytic converter 122. The exhaust-gas tract 120 additionally has an exhaust-gas pressure sensor 124 and an exhaust-gas sensor 126. The exhaust-gas pressure sensor 124 is configured to detect the pressure of an exhaust gas 150 in the exhaust-gas tract. The exhaust-gas sensor 126 is configured to acquire a measurement signal which is characteristic of the oxygen content in the exhaust gas 150. According to this embodiment, the internal combustion engine 100 has an exhaust-gas turbocharger 130. The exhaust-gas turbocharger 130 has a compressor 132 and a turbine 134. The compressor 132 is mechanically connected to the turbine 134 by means of a shaft 136. The turbine 134 is arranged in the flow path of the exhaust gas 150 and is driven by the exhaust gas 150. During operation of the internal combustion engine 100, the compressor 132 compresses the air 140 before it is introduced into the cylinders 102.

According to this embodiment, the intake tract 110 has pressure sensors 116, 118. One of the pressure sensors 116, 118 is an intake pipe pressure sensor 116 and the other of the pressure sensors 116, 118 is a charge pressure sensor 118. The intake pipe pressure sensor 116 is arranged in the flow path of the air 140 between the throttle flap 112 and intake valves of the cylinders 102. The charge pressure sensor 118 is arranged, in the flow path of the air 140, upstream of the throttle flap 112 and downstream of the compressor 132. During operation of the internal combustion engine 100, the intake pipe pressure sensor 116 and the charge pressure sensor 118 acquire the pressure of the air 140 prevailing at the respective installation positions of the sensors 116, 118.

The internal combustion engine 100 according to this embodiment additionally has a control unit 200, which has a processing unit 210, a program memory 220, a data memory 230 and a fault memory 240. The control unit 200 is configured, inter alia, to process the measurement signals of the intake pipe pressure sensor 116, of the charge pressure sensor 118, of the exhaust-gas pressure sensor 124 and of the exhaust-gas sensor 126 and to control the internal combustion engine 100 accordingly.

The control of the internal combustion engine 100 can be pursued for example through the control of the throttle flap 112. If, for example, the exhaust-gas sensor 126 detects that the oxygen content in the exhaust gas 150 is relatively low during the operation of the internal combustion engine 100, it is detected by the control unit that the combustion taking place in the internal combustion engine 100 is too rich, whereupon the internal combustion engine 100 is controlled such that the air supply is increased. In this regard, the throttle flap 112 can be correspondingly actuated such that the desired air/fuel ratio for the desired combustion in the cylinders 102 is correspondingly set.

The control unit 200 is configured to control the internal combustion engine 100 by means of the processing unit 210, which with programs from the program memory 220, with data from the data memory 230 and with data from the sensors of the internal combustion engine 100, the internal combustion engine 100 such that the internal combustion engine 100 is operated in the predetermined operating range in which reliable operation of the internal combustion engine 100 can be ensured. If it is detected that the internal combustion engine 100 is being operated outside of its predetermined operating range, a fault entry can be recorded in the fault memory 240. The internal combustion engine 100 additionally has a fault display device 300 which can be activated by the control unit 200 if the control unit 200 detects that the internal combustion engine 100 has been subjected to a power-changing manipulation.

If the internal combustion engine 100 is manipulated, for example with the aim of increasing the maximum power of the internal combustion engine 100, such that the air mass in the cylinders 102 is increased, the fuel quantity is automatically increased such that the desired air-fuel ratio is set. The engine power is thus increased. However, the internal combustion engine 100 is thereby operated outside of its predefined operating range, as a result of which the internal combustion engine 100 can be damaged.

Manipulation systems are known with the aid of which the acquired measurement signals of the pressure sensors 116, 118 can be modified such that the maximum air mass in the cylinder can be increased. With the aid of such manipulation systems, it is for example the case that the measurement signals acquired by the pressure sensors 116, 118 are lowered, for example by subtracting a certain value from the acquired measurement signals, and the lowered measurement signals are transmitted to the control unit 200. The control unit 200 seeks to compensate for the supposedly excessively low air pressure in the cylinder 102 and, for example, actuates the throttle flap 112 such that the air mass that is fed in is increased. The air pressure in the cylinders 102 increases accordingly, whereby the fuel injection is likewise adjusted. The internal combustion engine 100 is accordingly operated outside of its predefined operating range, and its power increases. The internal combustion engine 100 has been manipulated.

The control unit 200 is however designed to detect such a manipulation of the internal combustion engine 100.

Figure 2:
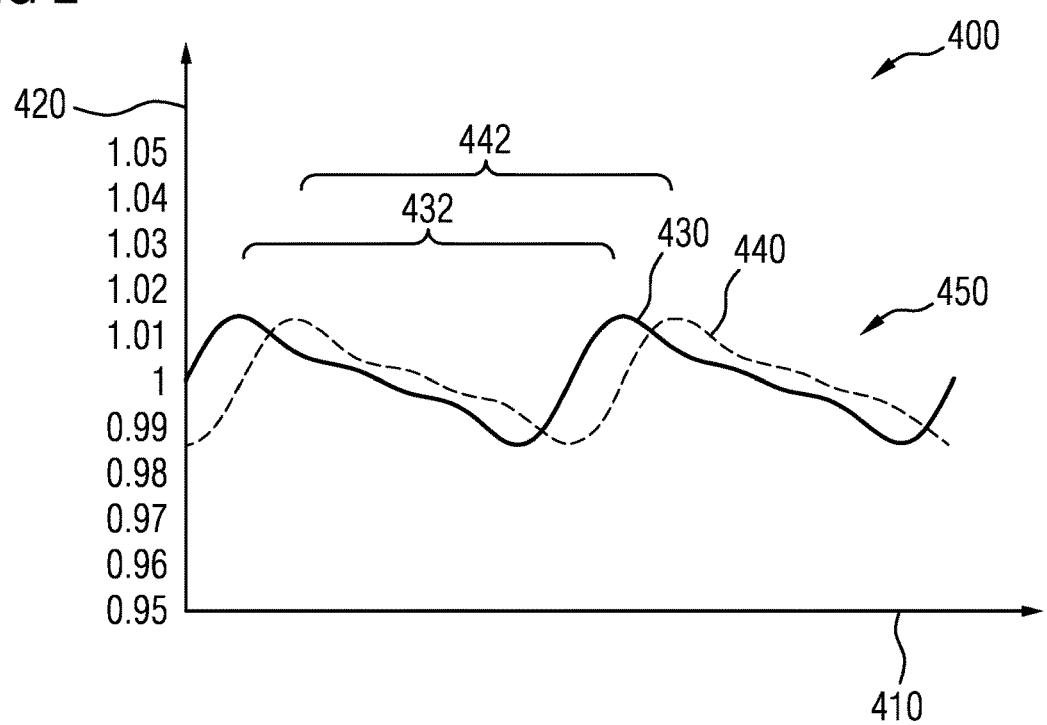
FIG. 2 shows a diagram relating to the detection of a power-changing manipulation of an internal combustion engine.

FIG. 2 shows a diagram relating to the detection of the power-changing manipulation of the internal combustion engine 100. In the diagram, the time is plotted on the X axis 410 and a value that is characteristic of the pressure in the intake tract 110 is plotted on the Y axis 420. A modelled signal profile 430 and an acquired signal profile 440 are illustrated in the diagram 400. The modelled signal profile 430 can be subdivided into modelled signal profile sections 432. The acquired signal profile 440 can be subdivided into acquired signal profile sections 442. The modelled profile sections 432 and the acquired signal profile sections 442 correspond to a period in the respective signal profiles 430, 440. The control unit 200 shown in FIG. 1 is designed to detect from the signal profiles 430, 440 whether the internal combustion engine 100 is being manipulated. For this purpose, from one of the signal profiles 440 acquired by means of the pressure sensors 116, 118, the periodically repeating acquired signal profile sections 442 are ascertained. Here, the acquired signal profile sections 442 are characteristic of the periodically repeating pressure changes in the intake tract 110. Additionally, for example from the program memory 220 and/or from the data memory 230 of the control unit 200, the modelled signal profile 430 is made available, from which periodically repeating modelled signal profile sections 432 are ascertained. The modelled signal profile sections 432 are characteristic of expected periodically repeating pressure changes in the intake tract 110. The control unit 200 subsequently compares at least one signal portion of the acquired signal profile section 442 with a corresponding signal portion of the corresponding modelled signal profile section 432. For the comparison, the respective signal profile sections 432, 442 of the same period are compared. If the internal combustion engine 100 is manipulated for example such that the pressure measured by means of the pressure sensor 116, 118 is transmitted with too low a value to the control unit 200, the acquired signal profile section 442 has a time offset in relation to the modelled signal profile section 432. This time offset can be acquired and can be compared as a corresponding signal portion of the respective signal profile sections 432, 442. If the offset deviates for example from a specified threshold value to too great a degree, it can be detected that the internal combustion engine 100 has been manipulated. Accordingly, the control unit 200 can store a fault in the fault memory 240.

Furthermore, the control unit 200 can correspondingly activate the fault display device 300 in order to display the manipulation.

It is conceivable that the acquired signal profile sections 442 are developed into acquired signal profile functions with the aid of a Fourier transformation. Furthermore, it is also conceivable that the modelled signal profile sections 432, which are stored for example in the data memory 230 of the control unit 200, are developed into modelled signal profile functions by means of a Fourier transformation. The comparison of the corresponding signal portions of the acquired signal profile function with the corresponding signal portions of the modelled signal profile function can be simplified, because the signal profile functions developed by means of the Fourier transformation can be processed more easily. It is also conceivable that the Fourier transformation is a discrete Fourier transformation.

According to one embodiment, the modelled signal profile 430 and/or the modelled signal profile section 432 and/or the modelled signal profile function is made available as a characteristic map which takes operating parameters of the internal combustion engine 100 into account. The characteristic map may for example be stored in the data memory 230 of the control unit 200 and used in accordance with the operating parameters of the internal combustion engine 100, such as a rotational speed and/or a load.

According to one embodiment, a phase of the acquired signal profile section 442 or of the acquired signal profile function as a signal portion is compared with the modelled signal profile section 432 with the phase of the modelled signal profile section 432 and/or of the modelled signal profile function as a corresponding signal portion. Here, in particular, the difference of the two phases can be compared, and it can be detected that the internal combustion engine 100 has been manipulated if the phase difference lies above a specific phase difference threshold value. The application of a value for manipulating the internal combustion engine 100 to a pressure acquired by means of the pressure sensor 116, 118 leads to a time offset in the data acquisition. This offset is evident as a phase difference in the comparison. Consequently, the manipulation of the internal combustion engine 100 can be detected in a simple and robust manner. If it is detected that the internal combustion engine 100 has been manipulated, a fault entry may additionally also be recorded in the fault memory 240 of the control unit 200.

The invention claimed is:

1. A method for detecting a power-changing manipulation of an internal combustion engine, wherein the internal combustion engine has an intake tract and a pressure sensor which is arranged in the intake tract, wherein the method comprises the following steps:

acquiring a signal profile over a specific time period by means of the pressure sensor, wherein periodically repeating acquired signal profile sections which are characteristic of periodically repeating pressure changes in the intake tract are ascertained from the acquired signal profile, providing a modelled signal profile over the specific time period, from which periodically repeating modelled signal profile sections which are characteristic of expected periodically repeating pressure changes in the intake tract are ascertained, comparing a signal portion of an acquired signal profile section, which is characteristic of the pressure change in the intake tract in a period of the acquired signal profile, with the corresponding signal portion of the corresponding modelled signal profile section, which is characteristic of the expected pressure change in the intake tract during the same period, in order to detect the power-changing manipulation, and detecting the power-changing manipulation based on a time delay in the acquired signal profile in relation to the modelled signal profile, wherein the time delay is caused by the power-changing manipulation, wherein measurement signals from the pressure sensor are manipulated by a power-changing manipulation device so that the control unit causes the internal combustion engine to operate at a power level higher than a predetermined operating range of the internal combustion engine.

2. The method as claimed in claim 1, wherein the comparison of the signal portion of the acquired signal profile section with the corresponding signal portion of the corresponding modelled signal profile section takes into account a signal portion difference which corresponds to the time difference between the signal portion of the acquired signal profile section and the signal portion of the corresponding modelled signal profile section.

3. The method as claimed in claim 2, wherein the power-changing manipulation of the internal combustion engine is detected if the signal portion difference exceeds a first threshold value.

4. The method as claimed in claim 1, wherein an acquired signal profile function, which is characteristic of the periodically repeating pressure changes in the intake tract, is developed from the acquired signal profile section with the aid of a Fourier transformation, and wherein a phase of the acquired signal profile function is ascertained, and wherein the ascertained phase as the signal portion of the acquired signal profile section is compared with a modelled phase as a corresponding signal portion of the corresponding modelled signal profile section, wherein the modelled phase is made available as a signal portion of the modelled signal profile section.

5. The method as claimed in claim 4, wherein a modelled signal profile function, which is characteristic of the expected periodically repeating pressure changes in the intake tract, is developed from the modelled signal profile section with the aid of a Fourier transformation, and wherein the modelled phase is ascertained from the modelled signal profile function and is made available.

6. The method as claimed in claim 4, wherein the modelled phase of the modelled signal profile section is made available in a manner dependent on at least one operating parameter of the internal combustion engine.

7. The method as claimed in claim 4, wherein, for the comparison of the at least one signal portion of the acquired signal profile section with the corresponding signal portion of the corresponding modelled signal profile section, a phase difference of the ascertained phase as a signal portion of the acquired signal profile section and the modelled phase as a signal portion of the corresponding modelled signal profile section is ascertained.

8. The method as claimed in claim 7, wherein the ascertained phase difference is compared with a phase difference threshold value, and wherein the power-changing manipulation of the internal combustion engine is detected if the ascertained phase difference exceeds the phase difference threshold value.

9. The method as claimed in claim 1, wherein the modelled signal profile is made available as a characteristic map which takes operating parameters of the internal combustion engine into account.

10. The method as claimed in claim 1, wherein the measurement signals from the pressure sensor are manipulated by the power-changing manipulation device so that an incorrect pressure is sent to the control unit causing the internal combustion engine to operate the internal combustion engine at the power level higher than the predetermined operating range of the internal combustion engine.

11. A device for detecting a power-changing manipulation of an internal combustion engine having an intake tract, the device comprising:

a pressure sensor arranged in the intake tract; and a control unit having a processing unit, the control unit being configured to:

acquire a signal profile over a specific time period by means of the pressure sensor, wherein periodically repeating acquired signal profile sections which are characteristic of periodically repeating pressure changes in the intake tract are ascertained from the acquired signal profile, provide a modelled signal profile over the specific time period, from which periodically repeating modelled signal profile sections which are characteristic of expected periodically repeating pressure changes in the intake tract are ascertained, compare a signal portion of an acquired signal profile section, which is characteristic of the pressure change in the intake tract in a period of the acquired signal profile, with the corresponding signal portion of the corresponding modelled signal profile section, which is characteristic of the expected pressure change in the intake tract during the same period, in order to detect the power-changing manipulation, and detect the power-changing manipulation based on a time delay in the acquired signal profile in relation to the modelled signal profile, wherein the time delay is caused by the power-changing manipulation, wherein measurement signals from the pressure sensor are manipulated by a power-changing manipulation device so that the control unit causes the internal combustion engine to operate at a power level higher than a predetermined operating range of the internal combustion engine.

12. The device as claimed in claim 11, wherein the power-changing manipulation device is configured to manipulate the measurement signals from the pressure sensor so that in incorrect pressure is sent to the control unit to cause the internal combustion engine to operate the internal combustion engine at the power level higher than the predetermined operating range of the internal combustion.

\* \* \* \* \*